United States Patent Office 2,899,921
Patented Aug. 18, 1959

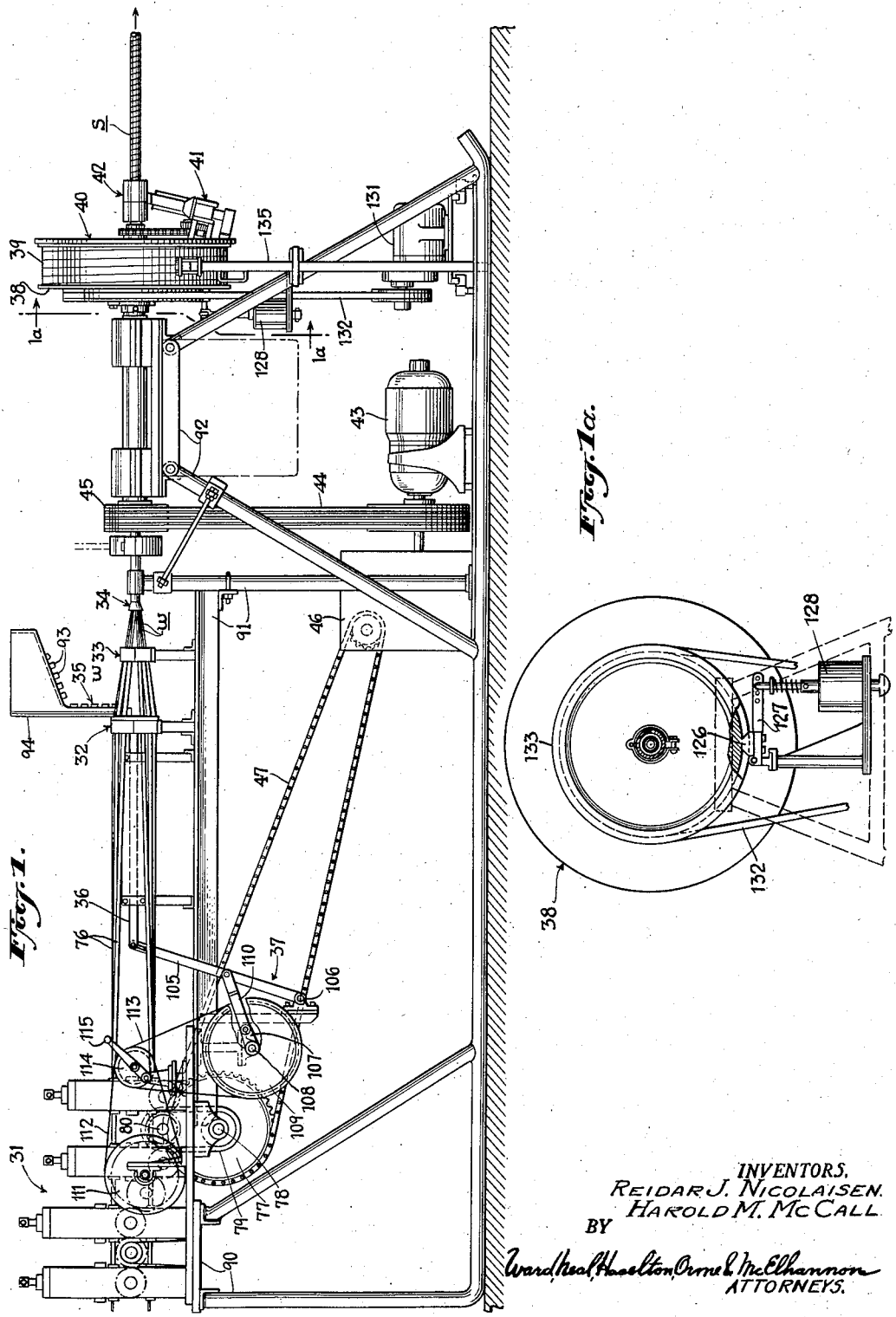

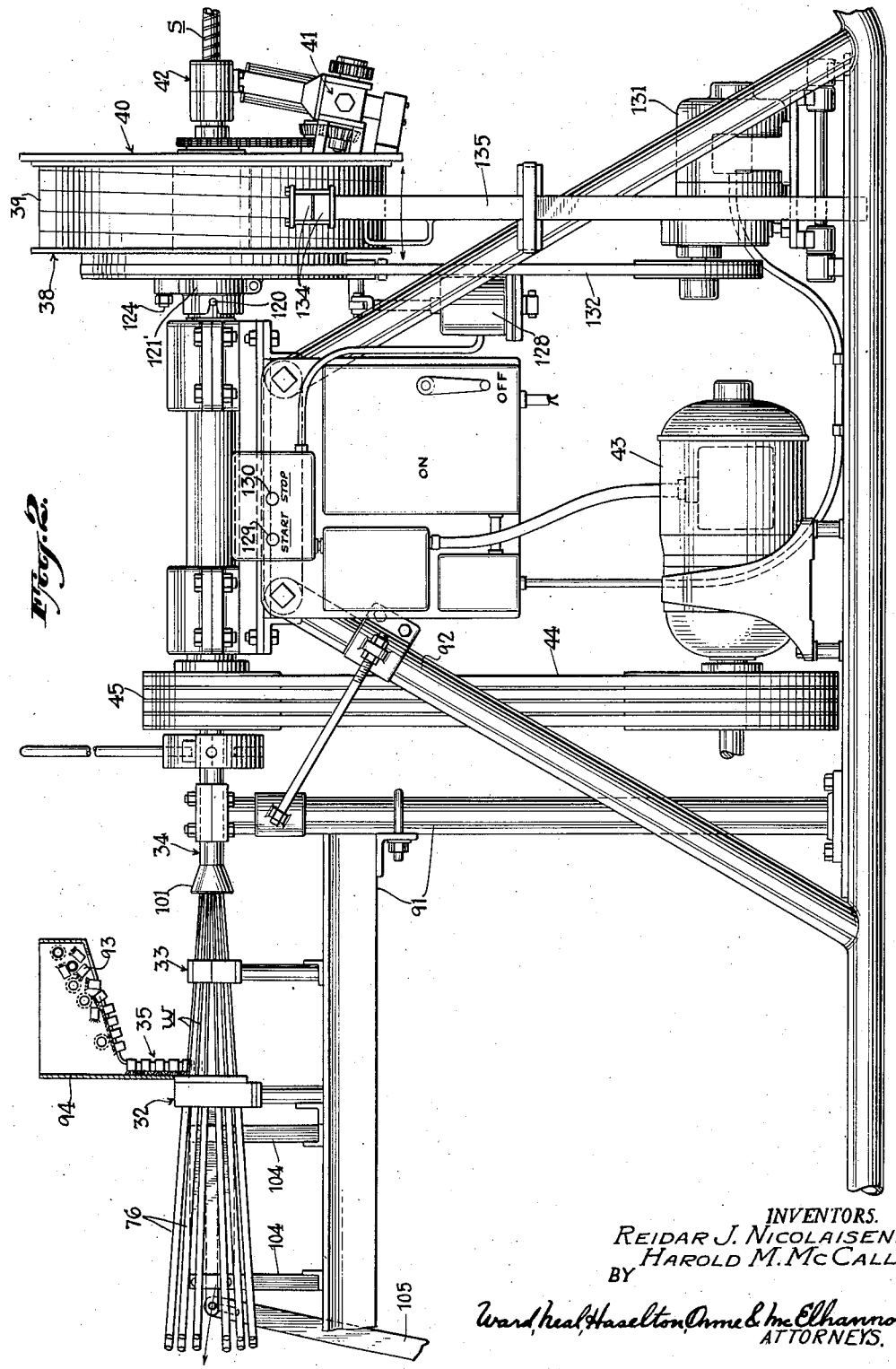

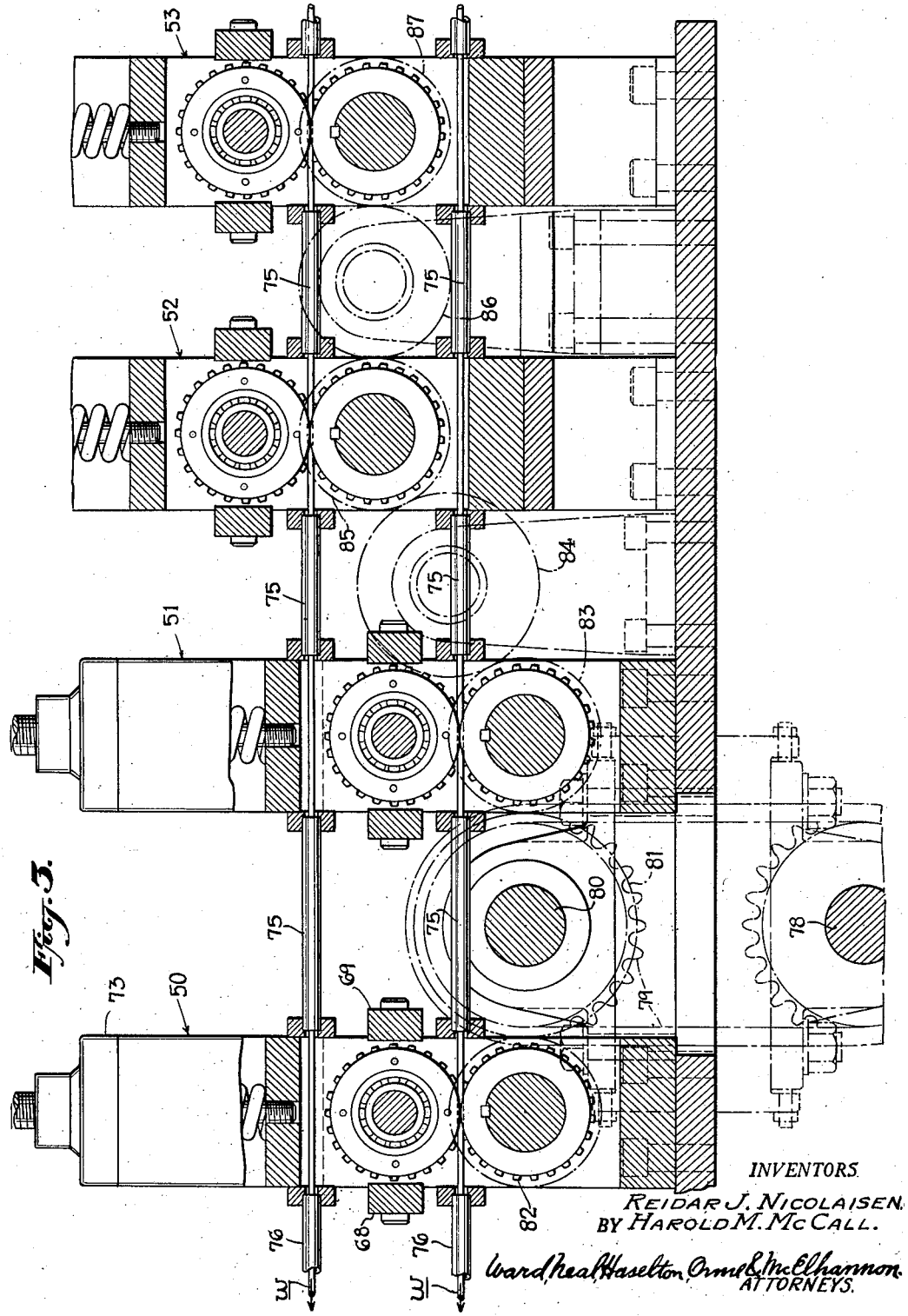

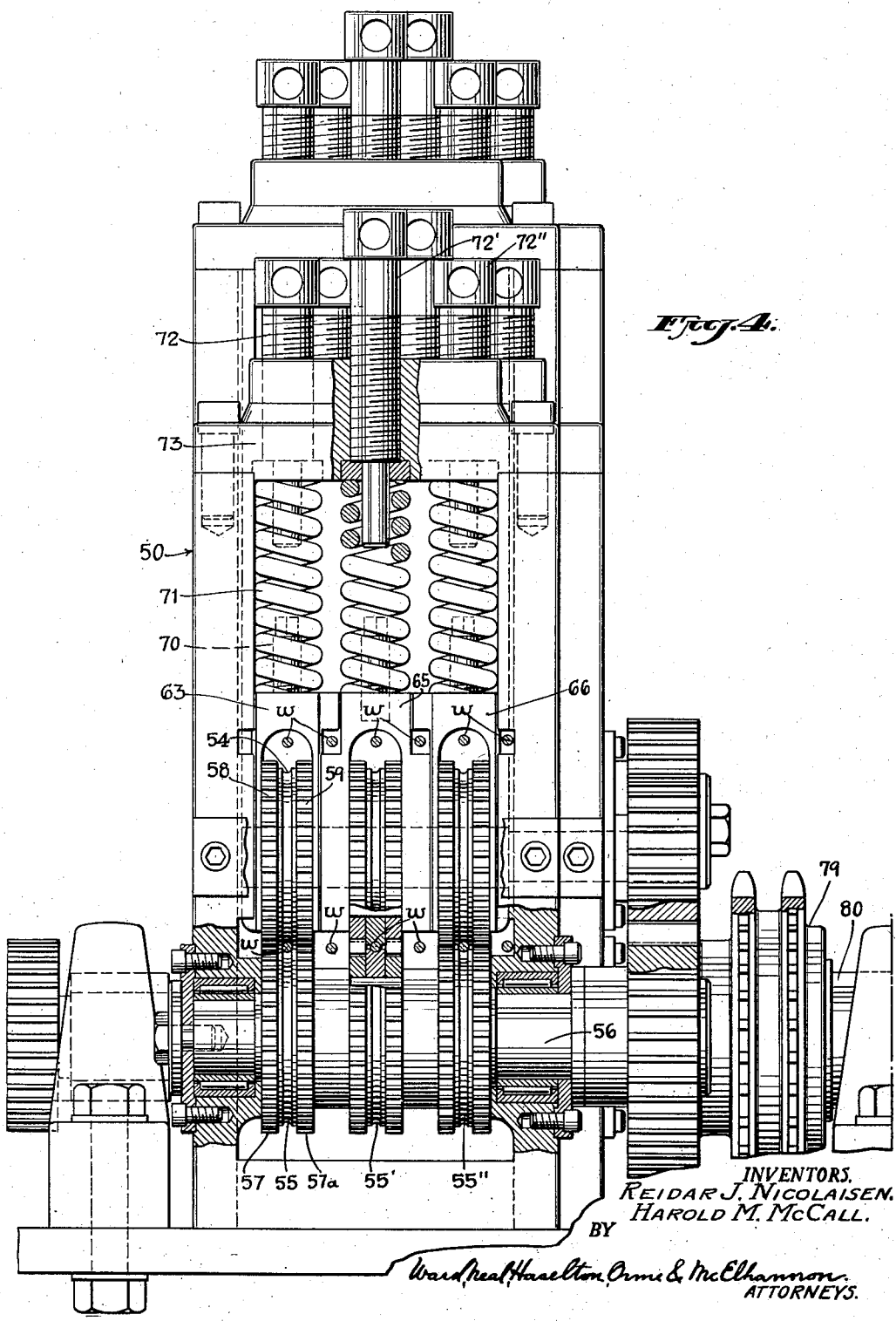

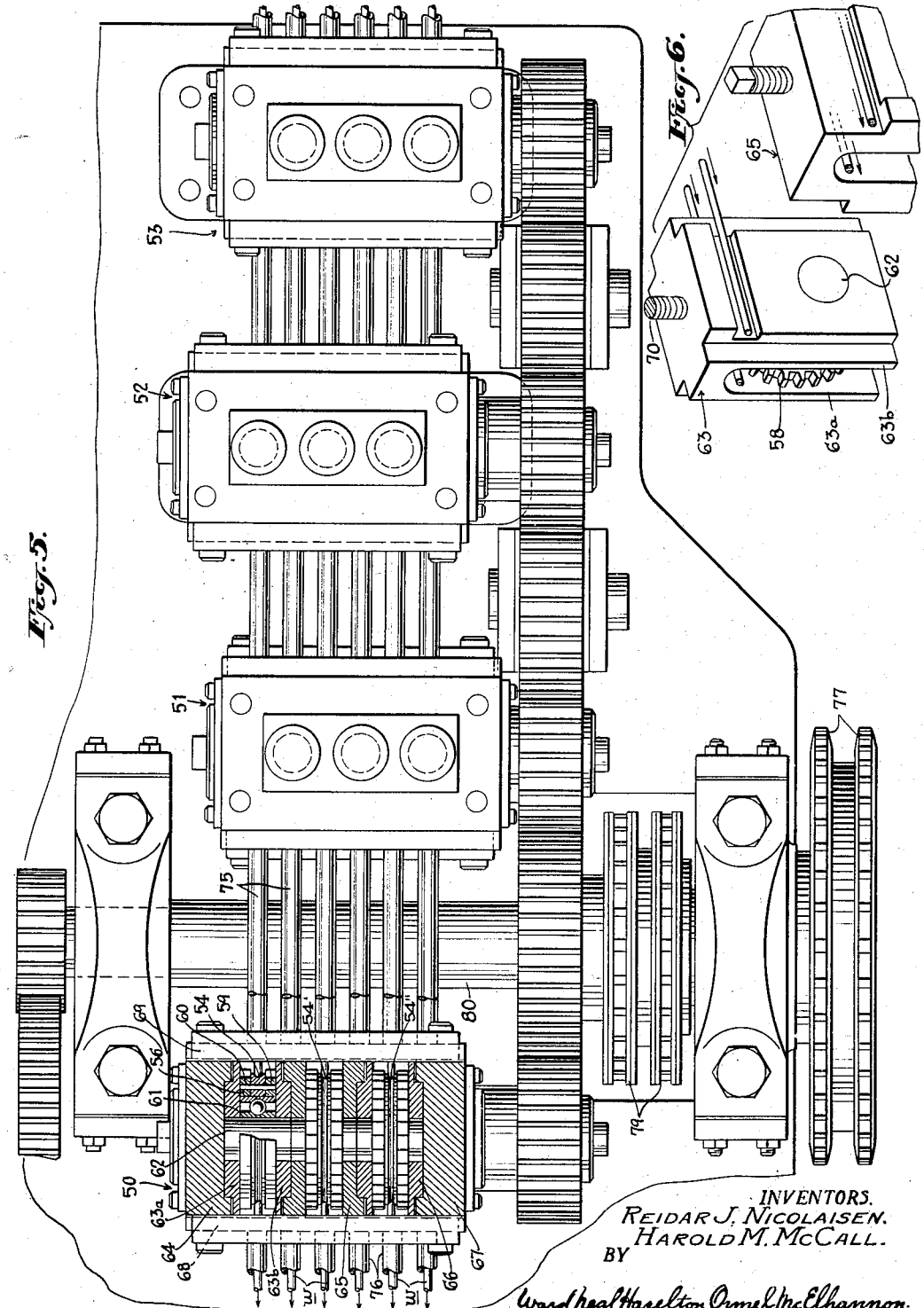

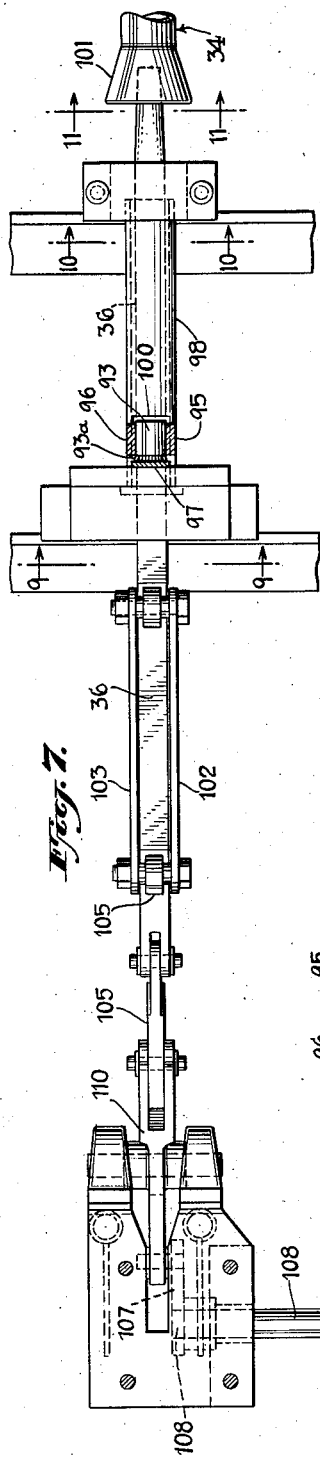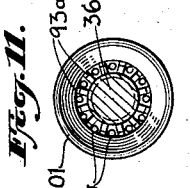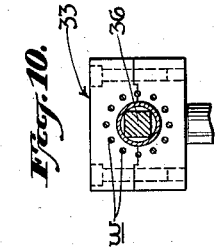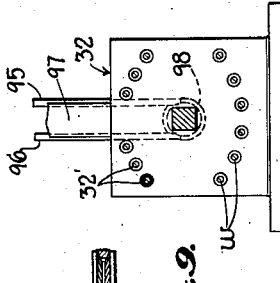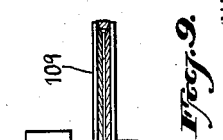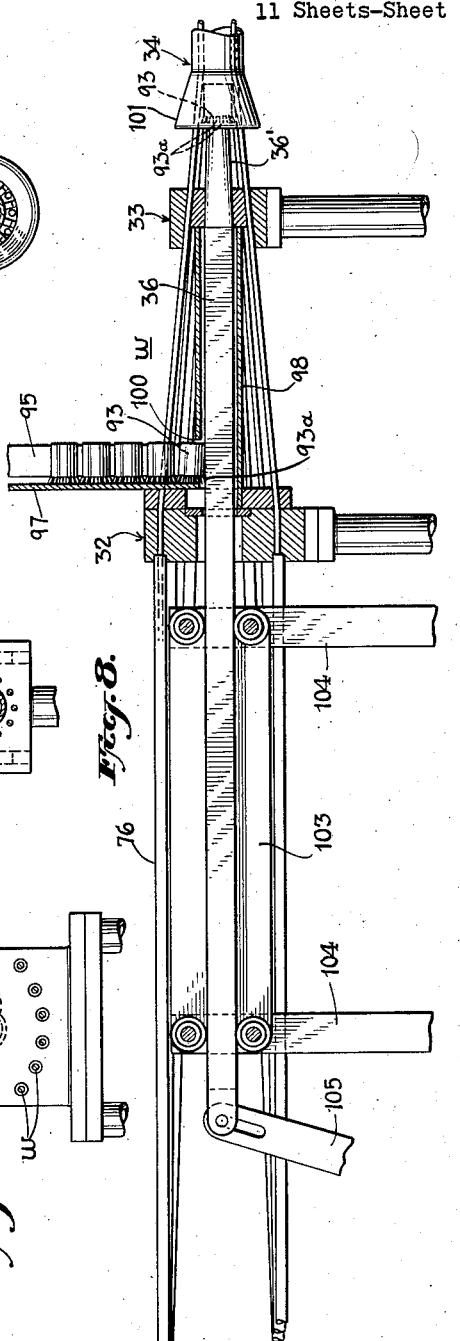

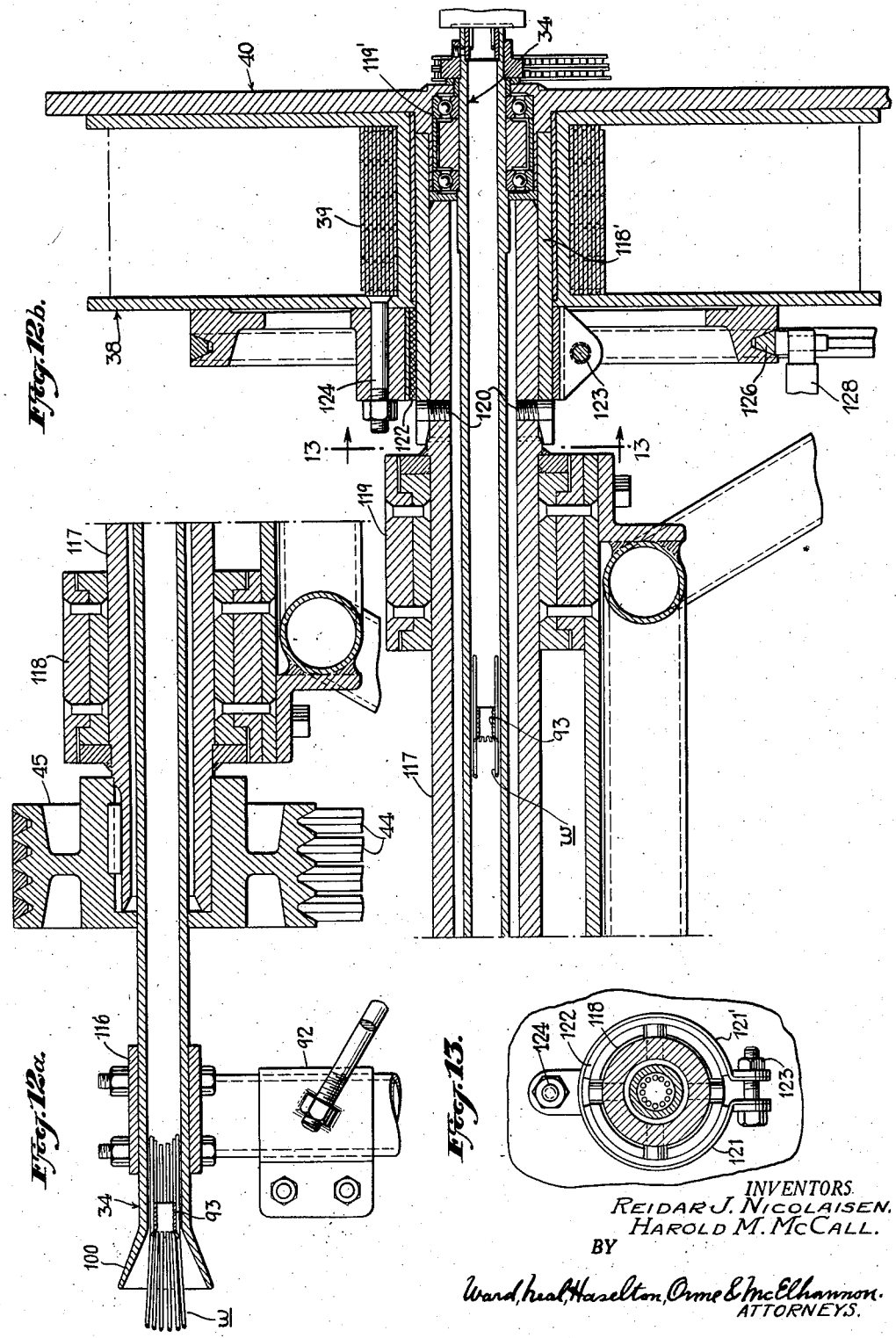

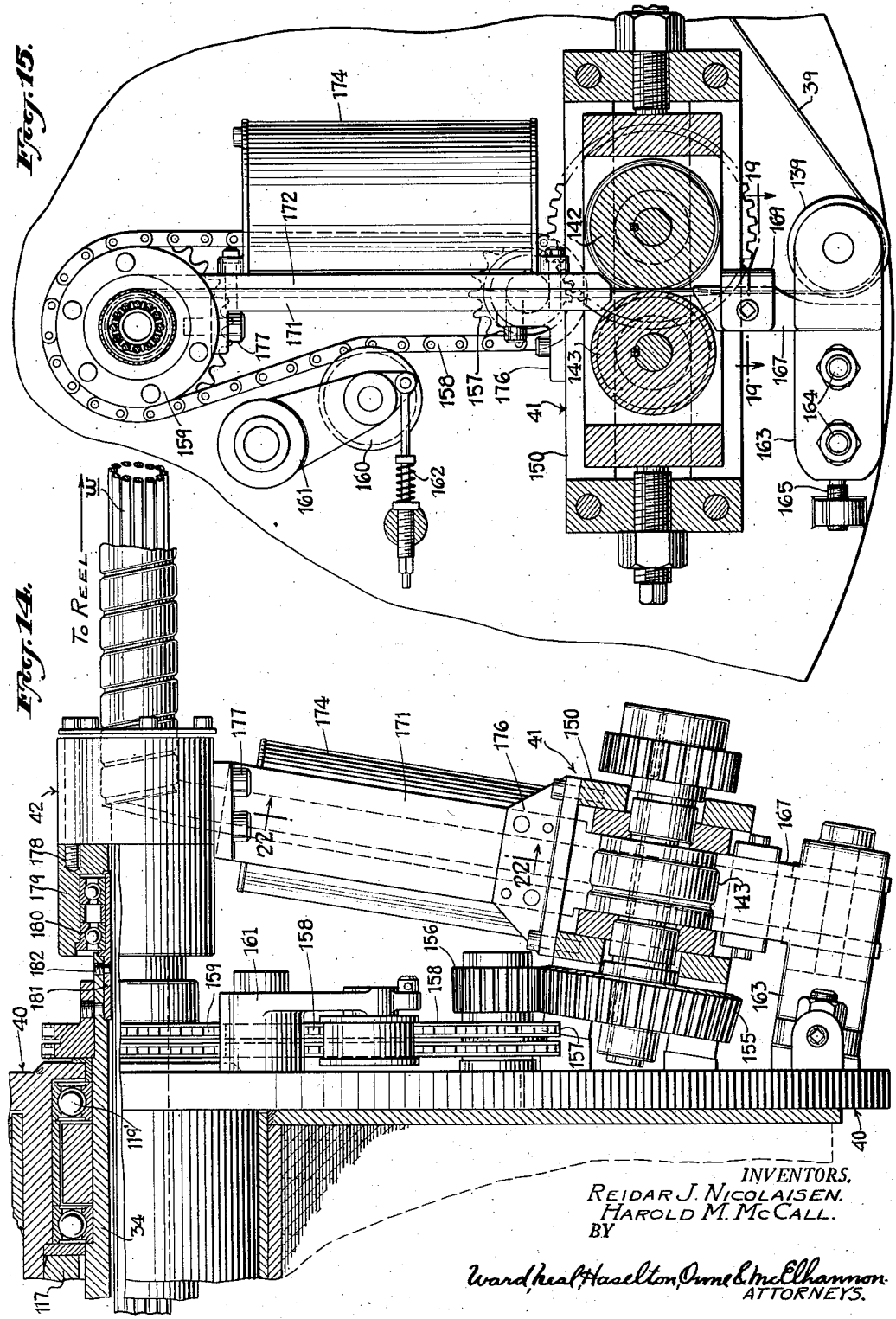

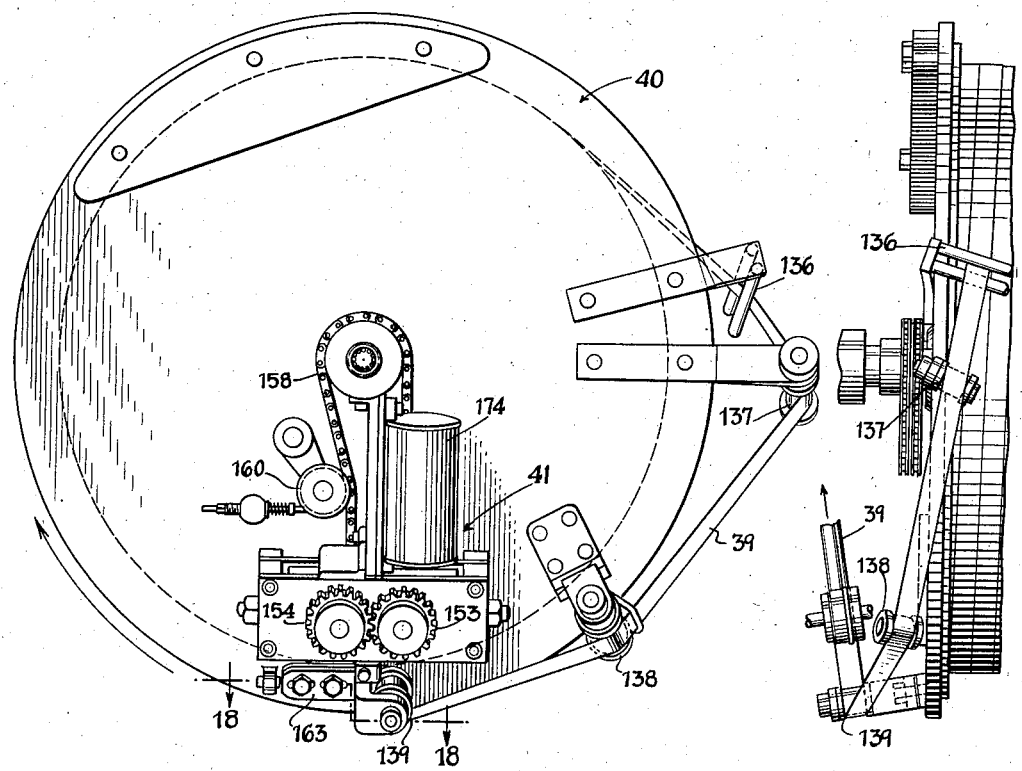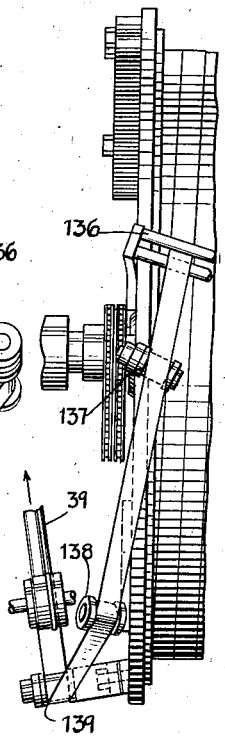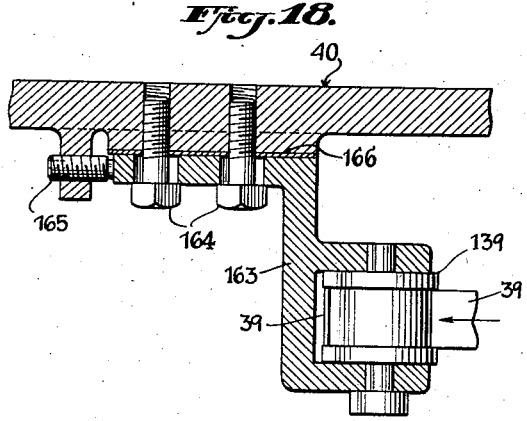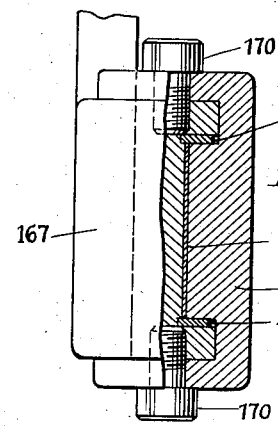

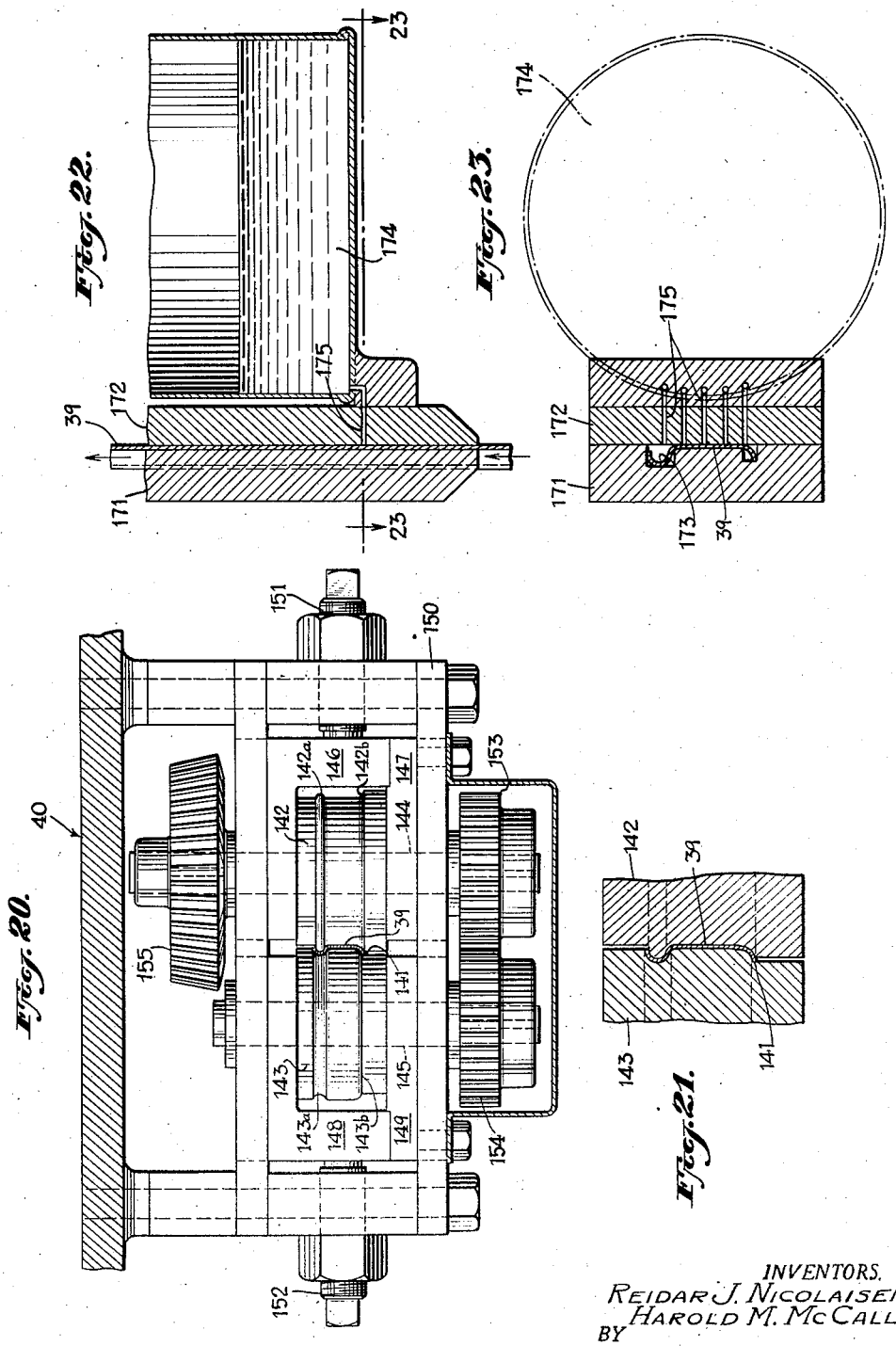

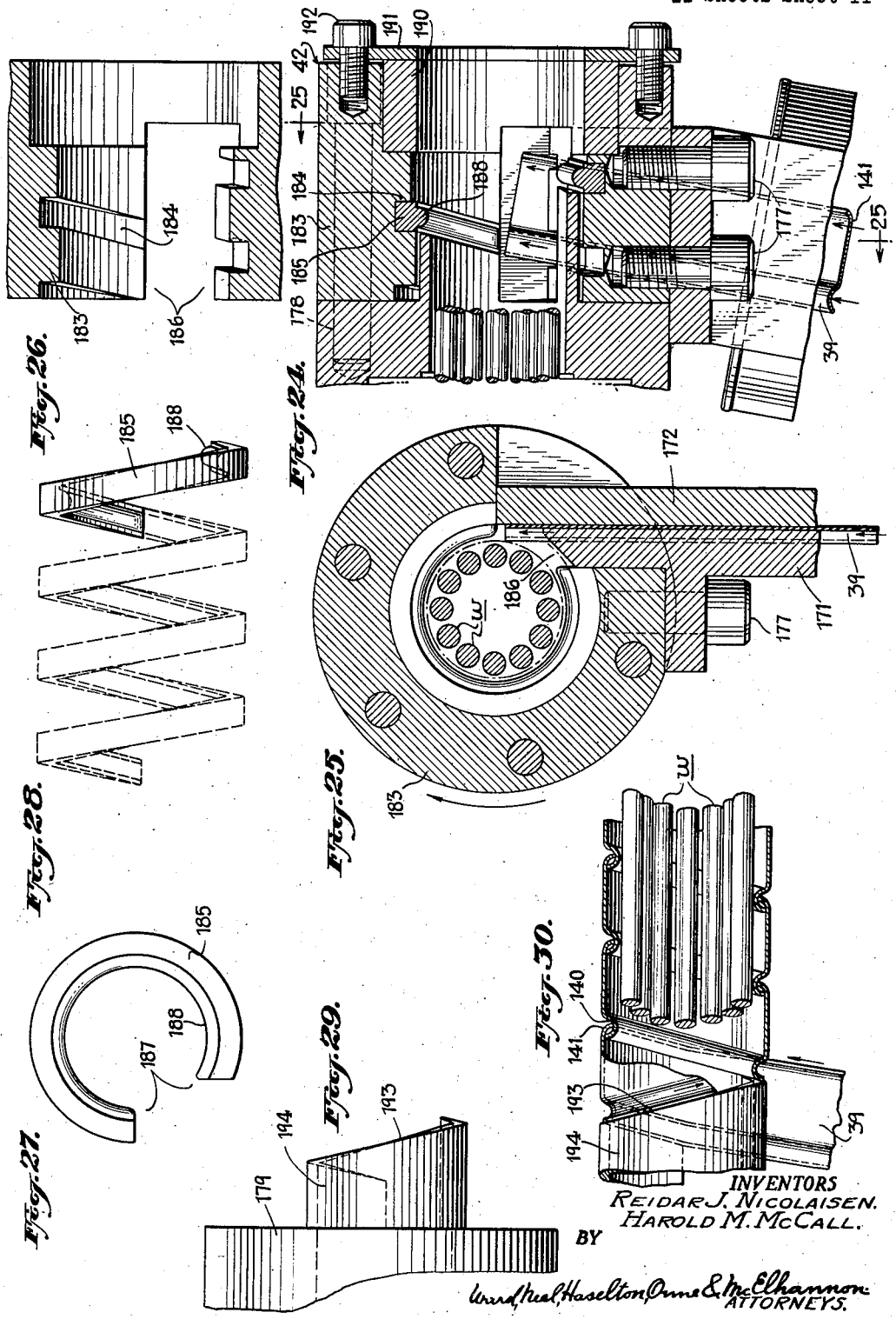

2,899,921

APPARATUS FOR MAKING SHEATHED CABLES

Reidar J. Nicolaisen, New York, N.Y., and Harold M. McCall, Fairlawn, N.J., assignors to Raymond International Inc., New York, N.Y., a corporation of New Jersey Application February 10, 1954, Serial No. 409,394

5 Claims. (Cl. 113—35)

This invention relates to apparatus for forming sheathed cables of a type containing numerous wires surrounded by a sheath formed of a thin helically wound sheet metal ribbon, the convolutions of which are shaped to form an interlocking helical joint.

The invention is particularly adapted for forming sheathed cable assemblies of the type disclosed in the copending application of Maxwell M. Upson 293,113, filed June 12, 1952, now Patent No. 2,677,957, and which are used in the prestressing of concrete structures. In using such assemblies they are mounted in a concrete mold at the location where reinforcement is desired, and the concrete is then poured about the sheath and allowed to set. Thereafter the wires in the sheath are heavily tensioned by forces which subject the concrete to compression, and while the wires are in this tensioned condition, cement grout is injected into the sheath along the wires and surrounding same and there allowed to set for firmly bonding the wires with respect to the interior walls of the sheath. Then the means or anchorages used at the ends of the wires to tension same may be removed, but the wires as maintained under heavy tension by the grout, will continue to subject the concrete structure about the sheath to heavy compression. In order that the grout may be injected into such sheaths so as to substantially entirely surround and securely bond each individual wire with respect to the interior of the sheath, it is important that the sheath not be wound about the wires in such a manner as to tightly embrace the wires or tend to prevent the grout from being freely injected throughout the length of the sheath. And preferably the sheath assembly should contain thimbles at spaced points for retaining the wires straight therein and in a formation of a generally annular cross-section. Also, to minimize the expense of the sheath assembly and to insure that it will be sufficiently flexible for assuming curved positions, the sheath preferably is formed of a ribbon of sheet steel which is quite thin, for example about 1/64" thick. Assemblies for the above indicated purposes in typical cases contain for example a dozen relatively large wires surrounded by a sheath which may have a diameter up to 1½" and which must be shaped, although of quite thin steel, about the wires without internal support or pressure against the wires, and meanwhile the numerous wires have to be uniformly advanced and the spacing thimbles properly located therebetween. Such assemblies preferably without interruption are formed in lengths of 200 feet or more.

In view of these various factors, a machine which will automatically produce a sheathed cable assembly for the above indicated purposes, presents difficulties which have heretofore not been encountered with machines for making conventional forms of helically wound sheaths.

Heretofore in various types of machines for forming cables with helically wound sheaths, the reels from which the wires are drawn and also the wind-up reel upon which the finished product is wound could all be of such size and weight that same could readily be rotated while the ribbon forming the sheath could be pulled from a fixed assembly carrying same, and be wound helically under pressure about the wires due to the rotation of the wires in passing to the wind-up reel. But for the purposes of the present invention, the reels from which the numerous heavy wires are to be drawn and the wind-up reel on which the finished product is to be wound are necessarily so large and heavy that they could not in practice be rotated in the process of winding the sheath thereabout, but instead all of the equipment for winding the helical sheath about the wires must be rotated about the wires while the latter are being uniformly advanced without rotation. Furthermore, since for the purposes of this invention, the sheath must loosely surround the wires and not grip the same, the wires cannot be advanced or pulled forward by reason of being embraced and advanced by the sheath ribbon as it is being wound on. Also the wires cannot be pulled through the machine since access thereto for pulling same is not possible if the finished product is to be reeled-up as formed. Also at proper intervals the wire spacing thimbles have to be inserted in the assembly as it is being formed, and this presents problems which have not heretofore been solved, so far as is known.

With the present invention, these difficulties are overcome by a novel construction and arrangement of the machine, so that the numerous wires which are to be contained in the finished assembly, are all individually pushed forwardly side by side in spaced relation into the machine while means are provided for automatically placing the thimbles at desired intervals in between the advancing wires which are then caused to converge about the thimbles and as the wires emerge from the machine, they pass through a rotating structure which pushes the metal sheath ribbon, properly shaped, into a helical formation with the edges of its convolutions interlocked and with the resulting formation of a sheath loosely surrounding the wires and advancing at the same speed with the wires, without binding same. Also preferably the sheath ribbon is so pushed into its helical formation that for some distance thereafter, the successive convolutions will be relatively turned slightly about the sheath axis in a direction tending to tighten the interlocked helical joint.

Various further and more specific objects, features and advantages of the invention will appear from the detailed description given below, taken in connection with the accompanying drawings which form a part of this specification and illustrate by way of example, a preferred form of the invention. The invention consists in such novel features, arrangements and combinations of parts as may be shown and described herein.

In the drawings:

Fig. 1 is a side elevational view of a preferred form of machine assembly embodying the invention;

Fig. 1a is a sectional view taken substantially along line 1a—1a of Fig. 1 and showing certain reel brake mechanism;

Fig. 2 is an enlarged view of the right hand portion of Fig. 1 showing the parts in further detail;

Fig. 3 is a side elevational view partly in vertical section, of a roller assembly and accompanying parts for pushing the wires through the machine;

Fig. 4 is an elevational view of the assembly of Fig. 3 as viewed from the left hand end of said figure;

Figure 5 is a plan view, certain parts being shown in section, of the apparatus of Fig. 3;

Fig. 6 is a perspective view showing portions of certain parts of Fig. 5;

Fig. 7 is a top plan view of the mechanism for inserting the thimbles in the advancing wire assembly;

Fig. 8 is a side view of a portion of the mechanism of Fig. 7;

Figs. 9, 10 and 11, respectively, are sectional views taken substantially along lines 9—9, 10—10, and 11—11 of Fig. 7;

Figs. 12a and 12b are vertical sectional views of certain of the mechanism shown at the right hand end of Fig. 1;

Fig. 13 is a sectional view substantially taken along the line 13—13 of Fig. 12b;

Fig. 14 is a plan view with certain parts in section, showing the assembly of mechanism for feeding the sheet metal ribbon and for forming same into the helical sheath surrounding the wires;

Fig. 15 shows the assembly of Fig. 14 as viewed from the right hand side of the latter figure;

Fig. 16 is an end view of the upper right hand portion of the apparatus of Fig. 1;

Fig. 17 is a side view of a part of the apparatus shown in Fig. 16;

Figs. 18 and 19, respectively, are sectional views taken substantially along line 18—18 of Fig. 16 and line 19—19 of Fig. 15;

Fig. 20 is an enlarged view showing the metal ribbon shaping rolls and mounting and driving gears therefor;

Fig. 21 is an enlarged cross-sectional view showing the manner in which the metal ribbon is shaped by the roller assembly of Fig. 20;

Fig. 22 is a sectional view taken substantially along line 22—22 of Fig. 14;

Fig. 23 is a sectional view taken along line 23—23 of Fig. 22;

Fig. 24 is an enlarged sectional view of the parts shown at the upper right hand portion of Fig. 14;

Fig. 25 is a sectional view taken substantially along line 25—25 of Fig. 24;

Fig. 26 is a view partly in section and partly broken away of one of the parts shown in Fig. 24;

Fig. 27 is a side view of another of the parts of assembly shown in Fig. 24;

Fig. 28 is a view illustrating the manner in which the part shown in Fig. 27 may be made;

Fig. 29 is a side view of one of the parts shown in Fig. 24 and

Fig. 30 is an enlarged view partly in section showing in further detail the manner in which the shaped metal ribbon is formed into the helical sheath surrounding the wires.

Referring now to Figures 1 and 2 in further detail, the apparatus as shown comprises a pusher roll assembly indicated generally at 31 for individually pushing the wires w in side-by-side spaced apart relation into and through the machine. In the assembly shown, the machine is equipped to insert twelve of such wires into the sheathed cable although the machine might of course readily be adapted for a greater or lesser plurality of wires. Guides 32, 33 are provided for causing the advancing wires to converge just before they enter a hollow fixed mandrel 34. A device indicated generally at 35 is provided for feeding the wire spacing thimbles into place between the converging wires. A pusher rod 36 is reciprocated by a mechanism generally indicated at 37 and acts periodically to push the thimbles into place between the converging wires just as they enter the hollow fixed mandrel 34. Nearer the other end of the machine where the finished sheathed cable s emerges, a reel 38 is provided and carries an extended length of the metal ribbon 39 which is to form the sheath. A rotatable headpiece or assembly 40 is mounted adjacent to the reel and carries a roller assembly indicated generally at 41 through which the metal ribbon passes and is suitably shaped to form the interlocking helical joint of the sheath and at the same time this roller means forces the ribbon into a forming die assembly indicated generally at 42, which is rotatable with the headpiece 40, and acts to shape the ribbon into the form of a helical sheath surrounding the advancing wires.

The machine is driven by a motor 43 connected by V belts 44 to a pulley at 45 which is mounted on a hollow shaft surrounding the fixed mandrel 34 and extends through the machine to rotate the headpiece 40. Motor 43 is also connected through suitable gearing in a box 46 and by sprocket chain 47 to operate the pusher roller assembly 31 and also the drive mechanism at 37 for reciprocating the thimble pusher 36.

*Wire pusher means*

Referring now to the pusher roller assembly in further detail as shown in Figures 3 to 6 inclusive, in order to push through the machine each of the twelve wires individually and all at the same predetermined speed, each wire is gripped in the nip between a pair of driven rollers or disc-like elements. In order to suitably mount all of these rollers in a reasonably compact arrangement and provide drive means therefor, same are preferably mounted in four separate roll stands indicated generally in Figures 3 and 5 at 50, 51, 52 and 53, respectively. The twelve wires w are preferably arranged with six of them as shown in side by side spaced apart relationship all on one plane and with the other six similarly arranged in a lower plane. Stands 50 and 51 may be of substantially the same construction except as shown in Fig. 5, stand 51 is located in a position offset horizontally with respect to stand 50. Of the six wires in the lower plane, three of which are in alternate positions are pushed by the rolls in stand 50 whereas the other three are pushed by the rolls in stand 51, stand 51 being offset horizontally with respect to stand 50 so that the three wires which are not pushed by stand 50 pass directly through spaces therethrough to be pushed by the rollers of stand 51. Stands 52 and 53 are also similar in construction to stands 50 and 51 except that their rollers are mounted at a higher position for engaging the six wires of the upper plane, all of the latter wires passing directly through stand 50 and 51 and three of them being pushed by the rollers in stand 52, while the other three pass directly through stand 52 and are pushed by the rollers of stand 53, the latter stand being offset horizontally with respect to stand 52.

With the stands and rollers therein arranged as above described, it is possible to advance the numerous wires all along closely adjacent parallel paths so that they do not have to be very abruptly deflected when they are pushed into the converging closely spaced relationship necessary in the finished cable sheath, and yet with this arrangement ample clearance is provided for permitting the use of pusher rollers and drive gears therefor of the necessary size and rigidity to reliably insure that each individual wire will be tightly gripped and pushed forward at substantially exactly the same speed as all the others.

As best shown in Fig. 4, each pair of rollers for gripping the wires comprises an upper roller or disc 54 and a lower roller or disc 55, each being formed with a groove of arcuate cross section in its periphery, the groove being of a size to accurately fit and embrace slightly less than one-half of the circumference of the wire. Each lower roller or disc as at 55, 55', 55'' is fixed upon a driven shaft 56 to rotate therewith and each is accompanied at each of its sides by gears as at 57, 57a which are also fixed to rotate with shaft 56 and are adapted to engage and drive gears such as at 58 and 59, the latter gears being located at opposite sides of each of the upper rolls such as at 54.

It should be here noted that the pitch circles of the gear 57–59 inclusive are preferably tangent to the plane containing the axis of the corresponding wire w. Gears such as at 58 and 59 may be fixed with respect to their corresponding rollers by pins 60 (Fig. 5) and the assembly thus pinned together may contain a ball-bearing as at 61 surrounding a short shaft 62. The upper rollers are each carried independently on short shafts whereas the lower rollers (such as at 55, 55′ and 55″, see Fig. 4) are all carried on a single common shaft. The upper rollers are carried on separate short shafts respectively so that each, being spring-pressed as hereinafter described, will be free to move up and down independently of the others whenever slight vertical movement thereof may be required because of irregularities in the diameter of the wire or imperfections thereon. It will be appreciated that if the upper rollers were mounted on a common shaft and if, for example, an enlarged spot occurred on one of the wires, then the pressure of one or more of such rollers against their corresponding wires might be variably released with the result that some of the wires would be pushed faster than others.

Each of the upper rollers with its accompanying gears and short shaft is mounted in a slidable block as at 63 (Figs. 4 and 6) formed with two spaced side portions 63a and 63b, such block being vertically slidable with the portion 63a slidably fitting in an end guide member 64 whereas the portion 63b slidably engages a portion of complementary shape on slidable block 65 for the next roller 54′ and its accompanying gears; similarly the third roller 54″ is received in a slidable block 66 which is slidable between block 65 and an end guide member 67. As will be clear from Figures 5 and 6 the slidable blocks 63, 65, and 66 as well as the end pieces 64 and 67 each have their relatively slidable side surfaces formed with complementary tongue and groove-like portions which function so as to retain the rollers and accompanying gears in axial alignment. To further insure that these blocks will not be deflected from proper alignment, heavy bars such as at 68 and 69 are bolted on to the members 64 and 67 to extend transversely from one side of the stand to the other.

As shown in Fig. 4, each of the blocks 63, 65 and 66 is provided at its upper end with a stud as at 70 about which heavy coiled springs as at 71 are placed, such springs being held under pressure at their upper ends by adjustable capstan screws as at 72, received within a top plate 73, extending across and suitably secured in place on the top of the roll stand. Thus by adjusting the screws 72, 72′ and 72″, it will be understood that the pressure which each of the upper rolls as at 54 applies to its corresponding wire may be readily adjusted.

The blocks 63, 65, and 66 are all formed to provide spaces or channels allowing each of the wires which are not pushed through roll stand 50 to pass freely through to be pushed at one of the subsequent roll stands.

As above indicated, each of the other roll stands 51, 52, 53 is of the same construction as stand 50 with the exception that in such other stands the rollers are offset either vertically or horizontally as required in each case to engage the wires which they are intended to push. Accordingly, the details of the construction of the stands 51, 52 and 53 may not be further described.

It will be understood that the wires w may be each pulled from reels (not shown) of any suitable known construction and which are located to the left of the apparatus of Fig. 1 (at the right of the apparatus as shown in Fig. 3). The wires in passing from one stand to another may be surrounded by tubes as at 75 to insure that each wire as it is advanced to and from its pusher rollers will be kept as straight as possible and to the same end, each of the wires at it emerges from stand 50 may be surrounded by tubes as at 76 which extend to the guide means 32 (see Fig. 1).

The pusher rollers may all be driven from sprocket chain 47 (Fig. 1) which drives a sprocket wheel 77 mounted on a shaft 78 which has a sprocket and chain connection 79 to a shaft 80 (Fig. 3). Shaft 80 has fixed thereto a gear 81 which in a manner readily apparent from Fig. 3, serves to drive a succession of gears 82 to 87 inclusive, for driving the shafts for the lower pusher rollers of each roll stand. And as hereinabove indicated, the various gears accompanying the lower pusher rollers respectively engage and act to drive the various gears which accompany the upper pusher rollers.

The wire pusher means as well as all other parts of the machine are preferably mounted upon rigid frame means as indicated at 90, 91 and 92 (Figs. 1, 2).

It will be understood that the numerous wires w are pulled into the machine from rotatable coils thereof (not shown) which are mounted to the left of the machine as it appears in Fig. 1. Also the finished sheath assembly s passes from the right hand end of the machine and is preferably wound as a large coil on a suitable reel (not shown).

*Thimble inserting means*

The means for inserting the thimbles at spaced positions between the wires will now be described with particular reference to Figs. 7–11 inclusive. Each of these thimbles as at 93 preferably comprises an integral hollow cylindrical member, one end of which is formed with a plurality of spaced-apart prong-like elements as at 93a which protrude outwardly and rearwardly of the thimble in positions respectively between each pair of wires so that the wires are retained in a formation of annular cross section. These thimbles may be dumped into a suitable hopper means such as partially shown at 94 in Figs. 1 and 2, and which is so shaped and provided with suitable agitating means (not shown) whereby the thimbles will be brought into alignment in a way such as heretofore well known in apparatus for delivering items such as nails or tacks to automatic machines. The aligned thimbles fall by gravity down between three vertical bar members 95, 96, 97, which are suitably supported adjacent the wire guide 32 and in a position so as to drop the thimbles one by one into a horizontal tube 98. Each thimble is pushed forward in the machine by a reciprocating pusher rod 36. That is, the tube 98 is mounted coaxially with the wires w in a position where the latter converge in passing from the guide means 32 to the guide means 33. The inlet end of tube 98 on its upper side is formed with a slot at 100 through which the thimbles may fall into the path of the pusher rod 36. The forward end of the pusher rod 36′ preferably is somewhat tapered so as to afford clearance with respect to the wires as they converge into their respective positions between the thimble prongs 93a just as the thimbles and wires are about to enter a funnel-shaped inlet 101 on the hollow fixed mandrel 34.

The pusher rod 36 is reciprocated by means which will now be described, at an adjustable frequency, and in a manner such that the tapered end 36′ is withdrawn to the left far enough to permit the lower thimble of the aligned series to fall into place, whereupon the rod advances to the position shown in Fig. 8 and is then again retracted. During such advance, it will be found that the thimbles gradually become embraced by the wires and with the thimble prongs fitting into place between the wires without any binding or jamming difficulties. This is in part due to the manner in which the wires are brought into convergence. That is, as the wires leave the pusher rolls, six of them advance in an upper plane and the other six in a lower plane, but as they pass through guide 32, the holes 32' for each wire in the latter, as shown in Fig. 9, are so arranged that the outermost wires of the upper group are deflected downwardly somewhat, whereas the outermost wires of the lower group are guided upwardly somewhat, and then as the wires enter the guide holes through guide 33 (Fig. 10) they are brought into an annular formation for the first time, but are still spaced apart enough so that, as the thimbles are pushed out of tube 98, each thimble prong will have ample clearance to enter the space respectively between each pair of wires.

As shown in Figs. 1, 7 and 8, the pusher rod may be guided by a pair of plates 102, 103 which are secured by bolts, as shown, to supporting members as at 104. The left hand end of the pusher rod has a pin and slot connection with a reciprocating lever 105, the lower end of which is pivotally mounted at 106 (Fig. 1). A rotating crank member 107 is mounted on a shaft 108 common to a pulley 109. This crank is pivotally connected to one end of a link 110, the other end of which is pivotally connected to the lever 105. Thus as the pulley 109 rotates, the pusher rod 36 will be reciprocated. Pulley 109 may be rotated at an adjustable speed from a pulley 111 through V-belt drive means as at 112, 113 between which there is interposed a suitable well known type of speed adjusting means 114 controlled by a lever 115. Pulley 111 may be driven by gearing from shaft 80.

*Rotatable headpiece and reel for metal ribbon*

As shown in Figs. 12a and 12b, the hollow mandrel 34 which is fixed with respect to the frame by clamping means at 116, extends forwardly through the center of the rotatable headpiece 40. This mandrel is surrounded by a shaft 117 which is rotated by the pulley 45 and is journaled in bearings as at 118, 119. The forward end of shaft 117 is surrounded by a hub portion 118' to which the headpiece 40 is fixed to rotate therewith about a ball bearing assembly 119'. The hub portion 118' is slidably removable from the rotatable shaft 117 but may be fixed to rotate therewith as by screw pins 120.

The reel 38 for carrying the metal ribbon 39 surrounds the hub portion 118 and may be turned with respect thereto. However, in order to prevent the reel from spinning too fast with respect to the rotatable headpiece 40, suitable friction drag means may be provided as shown in Fig. 13 in the form of a clamp having two arcuate portions 121 and 121' lined with suitable friction material such as used for example for brake bands as indicated at 122, for bearing against the hub portion 118 with variable pressure which may be adjusted by tightening or loosening the bolt 123. The members 121, 121' are fixed against rotation with respect to the reel as by a bolt 124. Thus any tendency for causing the reel to spin too fast as the metal ribbon 39 is being pulled off, will be resisted by the above described means and whereby the reel will be caused to turn just fast enough to deliver the metal ribbon at the desired speed.

The reel 38 when loaded with a quantity of ribbon 39 will be quite heavy and consequently when the machine is to be stopped, brake means must be provided to stop the rotation of the reel. This as shown in Figs. 1a and 12b may take the form of a shoe 126 mounted on a lever 127 which in turn is actuated by a solenoid 128. As shown in Fig. 2, the machine may be provided with electrical controls including stop and start buttons as at 129, 130 and the circuit connections thereto may be such as to automatically energize the solenoid 128 whenever the stop button is pressed so as to actuate the reel brake. In order to wind a quantity of the metal ribbon onto the reel 38 prior to starting the sheath formation, the reel may be independently driven by a motor 131 connected by a belt 132 to a reel drive pulley 133 (Fig. 1a) which may be the same pulley against which the brake shoe 126 bears.

In feeding the metal ribbon onto the reel 38, same may be arranged to pass through a narrow slot between two elements as at 134 (Fig. 2) mounted upon a lever 135 which may be rocked from side to side manually to deliver the ribbon uniformly over various parts of the reel.

As shown in Figs. 16 and 17, the metal ribbon 39 in coming off from the reel 38 may be passed between a pair of angularly positioned guide rods 136, thence over a guide roll 137, and further guide rolls 138, 139, all such guide means being mounted along the periphery of the rotatable headpiece 40 at such positions and angles as to guide the ribbon over the edge of the reel 38 and the edge of the headpiece 40 into the ribbon shaping roller means which will now be described.

*Ribbon shaping roller means*

The purpose of the ribbon shaping roller means indicated generally at 41 in Figs. 14 and 15, is to shape the ribbon as it comes from the reel 38 so that it will have a cross-section as shown, in Fig. 21, ready to be curled into a helical sheath with the edges of the turns interlocked as shown in Fig. 30. That is, one edge of the ribbon is to be formed with a channel-shaped depression of arcuate cross-section as at 140, whereas the other edge is arcuately curled inwardly as at 141 to engage in such channel. The resulting joint must be sufficiently tight to prevent any substantial leakage of mortar therethrough while at the same time the sheath will remain fairly flexible at such joint, permitting it to be bent to various curved shapes when used to reinforce concrete.

The rollers for shaping the ribbon are shown (Fig. 20) at 142, 143, the latter having a peripheral groove 143a and a rounded circumferential edge 143b, while roller 142 has a circumferential ridge 142a and a circumferential edge as at 142b. It will be apparent that the portions 142a and 143a cooperate to form the channel at one edge of the ribbon whereas the portions at 142b and 143b cooperate to form the inturned edge 141. These rollers are fixed upon shafts 144, 145 respectively, which in turn are journaled in blocks 146, 147 and 148, 149. Such blocks are surrounded and held by a rectangular frame 150 in the ends of which set screws 151, 152, are provided for adjusting the position of the blocks and consequently of the rollers in the frame, and in such manner that the rollers, as the ribbon passes through the nip thereof, will exert the required pressure to properly shape the ribbon. Shaft 144 has fixed thereon a gear 153 for driving a gear 154 secured to shaft 145. Shaft 144 is driven by a gear 155 which in turn (as shown in Figs. 14 and 15), is driven by a pinion 156, which pinion is driven by sprocket and chain means 157, 158 and 159. The sprocket at 159 is fixed upon the stationary hollow mandrel 34, as best shown in Fig. 14, so that when the rotatable headpiece 40 rotates about this sprocket, the latter will cause the sprocket chain 158 to be driven to thereby drive sprocket 157. The sprocket chain may be held yieldingly with suitable tension by a roller 160 mounted for example on a pivoted arm 161 with suitable spring means at 162 for urging such roller against the sprocket chain. It will be understood that substantially the whole assembly of mechanism shown in Figs. 14 and 15 is carried on the rotatable headpiece 40 and rotates therewith about the fixed sprocket 159.

In order accurately to shape the ribbon, it is important that same be fed to the nip of the rollers 142, 143 while being held accurately in proper position. To this end, guide roller 139 (Figs. 14-18 inc.) may be mounted upon an adjustable bracket 163 having slotted holes for receiving screws 164 for clamping same to the rotatable headpiece 40 (Fig. 18). Upon loosening these screws, the bracket may be adjusted by a set screw 165 which has the effect of adjusting the roller 139 in directions vertical to the plane of the ribbon. Shims as at 166 may be placed under the bracket to adjust the position of roller 139 in directions transverse to the path of the ribbon and in the plane of the ribbon. As the ribbon leaves the guide roller 139, it passes over a channel-shaped extension 167 (Fig. 15) on bracket 163 and thence into the nip between the rollers 142, 143. In order accurately to guide the ribbon in the channel of portion 167, means may be provided such as best shown in Fig. 19. That is, along each edge of the ribbon, strips 168 of tungsten carbide or some other suitable wear resistant material are placed to insure that the ribbon will accurately be held in the proper path against transverse deviation. These strips, as well as the face of the ribbon, may be held in place as by a member 169 which is secured in place by bolts 170. After some use, the strips 168 will tend to become worn with grooves where same frictionally engage the edges of ribbon 39, and in that event the strips may be reversed in either of two ways, viz. to present opposite faces or opposite edges thereof to the ribbon so that before the strips need to be discarded or replaced by new ones, they will be worn with four grooves along opposite edges and opposite faces thereof.

It should be noted that the shaping rollers 142, 143 are to be driven at a speed which bears a carefully pre-determined relationship to the speed of rotation of the head piece 40. The relationship of these speeds may be calculated mathematically, taking into consideration the path of the helically wound ribbon of the sheath and the fact that the ribbon has to be positively pushed by said shaping rollers at a speed such that it will be crowded into the die assembly 42 and be curled around into a sheath of the desired diameter without embracing the wires w at any point with any substantial pressure. In fact for best results the ribbon should be pushed into the die assembly 42 at a speed slightly faster than necessary merely to cover the wires with a stationary non-rotating helical sheath. That is, it is desirable to wind the ribbon about the axis of the sheath at a speed such that as the sheath leaves the apparatus, its convolutions will be tightened slightly, for example to the extent of one-half revolution for each 10 feet of the sheath. This will result in slightly tightening the interlocking joint at the edges of the helical convolutions during the time in which the sheath is advancing several feet from the machine. But beyond that region the sheath and cable assembly will be held against rotation about the sheath axis by reason of the fact that the finished cable assembly is being wound upon a reel or is passing over any suitable guide means for leading it away from the machine.

Now, since the ribbon after being shaped by the rollers 142, 143, has to be pushed into the die means 42, provision has to be made to prevent the ribbon (which is quite flexible) from being deflected out of a straight path after it leaves the nip of the rollers and before it enters the die means. For this purpose (and as shown in Figs. 14, 15 and 22, 23), a pair of guide plates 171, 172 are provided, plate 171 having suitably shaped grooves or channels 173 therein (Fig. 23) for receiving the ribbon 39 and plate 172 serving firmly to hold the ribbon in place. Since there will be considerable friction against the ribbon in passing through the guide means under longitudinal compression, lubricating means may be provided therefor in the form of an oil tank 174 mounted on guideway 172 and connected with the channel 173 by oil passages 175. As shown in Figs. 14 and 15, this guide assembly may be rigidly held in place on the rotatable headpiece 40 by reason of a bracket 176 with bolts for securing plate 171 to the roller supporting frame 150. The other end of plate 171 may be secured as by bolts at 177 to the die assembly 42, thereby causing such die assembly to rotate also with the rotatable headpiece 40. Plate 172 may be removably secured by bolts to plate 171.

*Die assembly*

As shown in Fig. 14, the die assembly 42 may be secured by bolts as at 178 to a cylindrical hollow holder 179 containing roller bearing means 180 for rotatably mounting same on a generally cylindrical stationary piece 181 which is fixed in the end of stationary mandrel 34 as by a set screw 182. That is, the piece 181 forms an extension for the end of mandrel 34, which extension is readily replaceable in case of wear and which also may be disconnected by removing the screw at 182 to readily permit removal of the whole die assembly and its roller bearing.

As best shown in Figs. 24–29 the die means comprises a generally cylindrical piece 183, the interior of which is formed with a helical groove 184, of rectangular cross-section and adapted to receive a helically shaped member 185 (Fig. 27). Members 183 and 185 respectively are interrupted at regions indicated at 186, 187, such interruption being of an extent just sufficient as indicated in Fig. 25 to permit the ribbon 39 as embraced by the guide plates 171, 172, to be pushed into the die assembly.

Member 185 on its inner surface is formed with a ridge 188 of a shape to fit the channel 140 in the edge of the ribbon. The helical piece 185 may be formed by shaping in a lathe a helical member with several turns of the proper cross-section, and as shown in Fig. 28 and this member may be cut to form several of the members such as shown in Fig. 27. These members may be screwed into place in the helical groove 184 in member 183 and same may be readily removed for replacement or inspection by removing a retainer ring 190 which will be held in place by a ring 191 and bolts 192. As the helical piece 185 is screwed into place, it will bear against the end of guide piece 172 and extend along an inner helical edge 193 (Fig. 29) formed on a protruding portion 194 integral with member 179. The edge 193 will comprise the edge against which one edge of ribbon 39 will bear as it is being crowded into place as shown in Fig. 30.

Thus as the ribbon 39 is pushed into the die means 42 by the rollers 142, 143, the channel-shaped portion of the ribbon 140 will be accurately held within a helical path and the ridge 188 on die member 185 will prevent such channel from collapsing while also the helical edge 193 will retain the outer channel edge in proper position. Meanwhile, the other and curled edge 141 of the ribbon will be forced into a helical path and into the channel 140 of the previously formed convolution. The helical sheath is thus accurately formed and wound in place about the cable wires w without the necessity of subjecting such wires to embracing pressure and thus the cable wires w are left free for being bonded to cement grout throughout the surfaces of the wires except for any limited areas of contact which they may have with the inwardly facing ridges at the channel 140.

Although a preferred embodiment of the invention is herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for forming a cable assembly containing a plurality of wires separated by spacer elements, said wires being loosely surrounded by a sheath formed of helically wound metal ribbon, the edges of the convolutions of which are interlocked, such apparatus comprising in combination: pluralities of pairs of rollers, each pair respectively being shaped and positioned to engage in a nip therebetween one of the wires to individually push same through the apparatus; means for driving said rollers all with the same predetermined peripheral speed; means for guiding the advancing wires in converging relation into the space to be surrounded by the sheath; means for feeding spacer elements of a shape adapted to maintain said wires in spaced apart relationship one from the other; a rotatable reel for carrying a coil of the metal ribbon and an adjacent rotatable headpiece, said headpiece surrounding the path of the wires; a pair of driven shaping rollers mounted on said headpiece and shaped and positioned to provide a nip therebetween for pulling the ribbon from the reel therethrough and at the same time to shape the ribbon edges for forming the interlocking joint between its convolutions on the sheath when formed; a die assembly having a hollow cylindrical interior mounted to rotate with said headpiece about said path, said die assembly interior being provided with a helical formation extending therealong and shaped so as to matingly engage a portion of said ribbon and guide same along a helical path through the die assembly; and means for driving the headpiece and means for driving said shaping rollers at speeds relative to one another such that the shaping rollers push the ribbon into said die assembly and wrap it into a sheath under pressure against the internal formation in the die assembly and cause the resulting sheath to be extruded independently of the wires contained therein, but at approximately the same linear speed as that of the wires as pushed by the first mentioned rollers.

2. Apparatus for forming a cable assembly containing a plurality of wires separated by spacer elements, said wires being loosely surrounded by a sheath formed of helically wound metal ribbon, the edges of the convolutions of which are interlocked, such apparatus comprising in combination: pluralities of pairs of rollers, each pair respectively being shaped and positioned to engage in a nip therebetween one of the wires to individually push same through the apparatus; means for then guiding the wires in converging relation into the space which is to be surrounded by the sheath; means for feeding spacer elements of a shape adapted to maintain said wires in circularly spaced apart relationship one from the other inside the space to be surrounded by the sheath; a rotatable reel for carrying a coil of the metal ribbon and an adjacent rotatable headpiece, said headpiece surrounding the path of the wires; a pair of shaping rollers mounted on said headpiece and shaped and positioned to provide a nip therebetween for pulling the ribbon from the reel therethrough and at the same time to shape the ribbon edges for forming the interlocking joint between its convolutions on the sheath when formed; a die assembly having a hollow cylindrical interior mounted to rotate with said headpiece about said path, said die assembly interior being provided with a helical formation extending therealong and shaped so as to matingly engage a portion of said ribbon and guide same along a helical path through the die assembly; means for rotating the headpiece and also said shaping rollers at relative speeds such that the shaping rollers push the ribbon into said die assembly and wrap it into a sheath under pressure against the internal formation in the die assembly and cause the resulting sheath to be extruded independently of the wires contained therein, and means spaced from the exit end of the apparatus for there retaining the sheath against rotation about its axis, said relative speeds being such that the sheath convolutions, just after being extruded, are relatively rotated somewhat in a direction tending to tighten the helical joint.

3. Apparatus for forming a cable assembly containing a plurality of wires which are retained in a spaced relationship of annular cross-section by pronged thimbles located at intervals, the assembly including a sheath formed of helically wound metal ribbon, the edges of the convolutions of which are interlocked, such apparatus comprising in combination: pluralities of pairs of rollers, each pair respectively being shaped and positioned to engage in a nip therebetween one of the wires to individually push same through the apparatus; means for driving said rollers all with the same predetermined peripheral speed; means for converging the advancing wires into said relationship of annular cross section; thimble feeding mechanism for discharging the thimbles into a thimble guide means between the advancing wires, and in advance of a wire guide means a thimble pusher for periodically advancing each discharged thimble from said thimble guide means to said wire guide means into position to be embraced by the converging wires as they enter said wire guide means; a rotatable reel for carrying a coil of the metal ribbon and an adjacent rotatable headpiece, said reel and headpiece surrounding the path of the wires and maintaining said wires and thimble in assembled relationship until the sheath is formed therearound; a pair of rollers mounted on said headpiece and shaped and positioned to provide a nip therebetween for pulling the ribbon from the reel therethrough and at the same time to shape the ribbon edges for forming the interlocking joint between its convolutions on the sheath when formed; a die assembly mounted to rotate with said headpiece about said path and having an internal helical formation; and means for driving the headpiece and also said latter rollers at speeds such that the rollers push the ribbon into said die assembly and wrap it into a sheath under pressure against the internal formation in the die assembly and cause the resulting sheath to be extruded independently of the wires contained therein, but at approximately the same linear speed as that of the wires as pushed by the first mentioned rollers.

4. Apparatus for forming a cable assembly containing a plurality of separate wires which are retained in spaced relationship of annular cross-section by thimbles located at intervals, said assembly including a sheath formed of helically wound metal ribbon, such aparatus comprising in combination: means for pushing said wires through the apparatus, means for converging said wires into said spaced relationship of annular cross-section, a thimble feeding mechanism for discharging the thimbles into a thimble guide means positioned between the advancing wires and in advance of a wire guide means, said thimble guide means extending longitudinally along the path of said wires, a thimble pusher comprising a pusher rod aligned with and adapted in its advanced position to telescope within said longitudinal thimble guide means, and means for reciprocating said pusher rod from its retracted position to said advanced position so as to periodically engage and advance each discharged thimble from said thimble guide means to said wire guide means into position to be embraced by the converging wires as they enter said wire guide means, together with means for thereafter forming the sheath around the advancing wires and maintaining said wires and thimble in assembled relationship until the sheath is formed therearound.

5. Apparatus for forming a cable assembly containing a plurality of wires separated by spacer elements, said wires being loosely surrounded by a sheath formed of helically wound metal ribbon, the edges of the convolutions of which are interlocked, which comprises in combination roller means for uniformly advancing each wire along the path to be surrounded by the sheath; means for feeding spacer elements of a shape adapted to maintain said wires in spaced apart relationship one from the other; a rotatable reel for carrying a coil of the metal ribbon and an adjacent rotatable headpiece, said headpiece surrounding the path of the wires; a pair of driven shaping rollers mounted on said headpiece and shaped and positioned to provide a nip therebetween for pulling the ribbon from the reel therethrough and at the same time to shape the ribbon edges for forming the interlocking joint between its convolutions on the sheath when formed; a die assembly having a hollow cylindrical interior mounted to rotate with said headpiece about said path, said die assembly interior being provided with a helical formation extending therealong and shaped so as to matingly engage a portion of said ribbon and guide same along a helical path through the die assembly; and means for driving the headpiece and means for driving said shaping rollers at speeds relative to one another such that the shaping rollers push the ribbon into said die assembly and wrap it into a sheath under pressure against the internal formation in the die assembly and cause the resulting sheath to be extruded independently of the wires contained therein, but at approximately the same linear speed as that of the wires as pushed by the first mentioned rollers.

References Cited in the file of this patent

UNITED STATES PATENTS

| | | |
|---|---|---|
| 809,561 | Greenfield | Jan. 9, 1906 |
| 1,117,685 | McMurtrie | Nov. 17, 1914 |
| 1,334,787 | Palmer | Mar. 23, 1920 |
| 1,492,067 | Brinkman | Apr. 29, 1924 |
| 1,643,008 | Fentress | Sept. 20, 1927 |
| 1,668,758 | Bryant | May 8, 1928 |
| 1,956,730 | Reichelt | May 1, 1934 |
| 2,172,945 | Seeley | Sept. 12, 1939 |
| 2,388,106 | Wooler | Oct. 30, 1945 |